United States Patent [19]

Parnaby

[11] 4,075,095
[45] Feb. 21, 1978

[54] TREATMENT OF EFFLUENT

[76] Inventor: Derek Parnaby, Bridge End Ferryhill Station, Durham, England

[21] Appl. No.: 695,459

[22] Filed: June 14, 1976

[51] Int. Cl.² .......................................... B01D 23/24
[52] U.S. Cl. .................................... 210/82; 210/112; 210/265; 210/528
[58] Field of Search ............... 210/265, 291, 293, 99, 210/103, 109, 112, 208, 528, 82

[56] References Cited

U.S. PATENT DOCUMENTS

| | | | |
|---|---|---|---|
| 1,919,566 | 7/1933 | Laughlin et al. | 210/265 X |
| 3,653,511 | 4/1972 | Gustavsson et al. | 210/112 |

Primary Examiner—William A. Cuchlinski, Jr.
Attorney, Agent, or Firm—Flynn & Frishauf

[57] ABSTRACT

A sand settler filter with a weir and scum trough mounted on a tank having a valved sludge outlet, a perforate filter bed support carried below the weir and above an effluent feed to the tank is characterized by a pressure sensor responsive to a resistance to movement of contents of the tank and connected to a valved outlet from the tank, preferably through a ballast chamber operable, in a method according to the invention; for back flushing the filter bed and the valved sludge outlet preferably being operable in response to a torque sensor drivably coupled to a paddle carried at the bottom of the tank.

9 Claims, 1 Drawing Figure

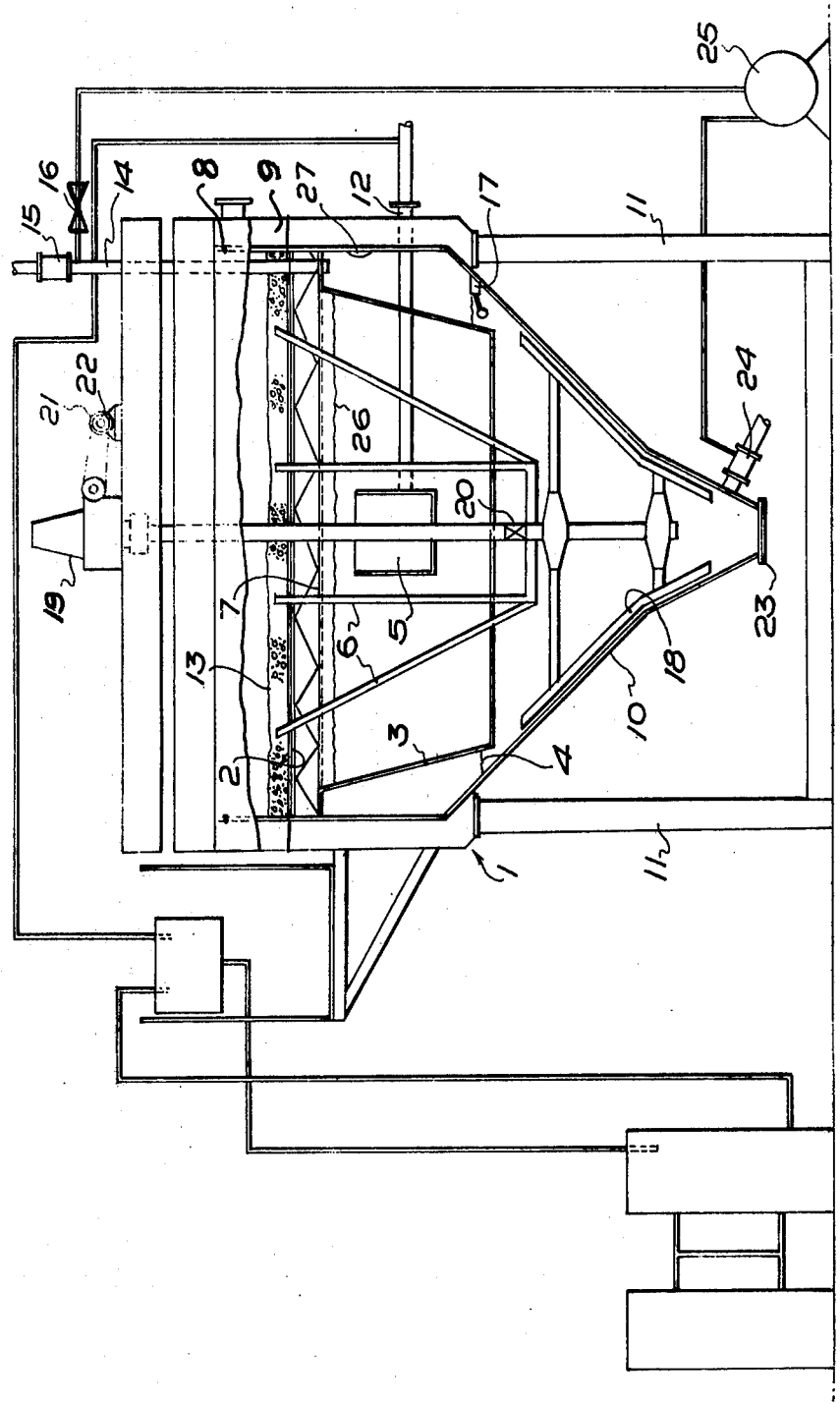

TREATMENT OF EFFLUENT

This invention concerns improvements in and relating to the treatment of effluent.

Sand filters are generally provided with a pump for forcing liquor through an enclosed particulate bed of sand or gravel. In some installations these surmount an elongated funnel towards the bottom of which a pressure sensor is actuated by sludge, for example from liquor exhausted from sand and gravel plants, paper mills and as sewage effluent, and operative to open a passage at the lowermost end of the funnel.

An object of the invention is to obviate undue discolouration in treated liquor and minimise squelching of sludge or forced channelling through a filter bed.

According to the invention a sand settler filter comprises a tank in which a perforate support is carried below a weir of a scum trough together with an effluent feed closed at its upper end elevated above the weir and provided with a pressure sensor connected for actuation, at a predetermined sensed head pressure, of an outlet at the bottom of the tank.

The support is preferably a perforate e.g. slotted plate; alternatively or additionally a wire deck may be employed.

A ballast zone is preferably provided below the support and having a lower opening into the tank; it has a volume in excess of the displacement, allowing for the sand or gravel charge, between the support and the weir and is provided with a valved vent pipe and a valved compressor connection.

In use gravel and/or sand or the like particulate filter medium is banked on the support, e.g. in thickness up to 9 or 10 inches below the weir.

The invention includes a method of effluent treatment comprising distributing effluent from the feed within the tank and allowing it to percolate through the support and filter bed, whilst sludge settle down the tank, and the treated liquor is discharged from the scum trough. The filter bed and support may be purged by backwashing the bed by dropping the level or effluent in the tank.

Backwashing may be effected without the outlet of incompletely settled sludge from the tank, by opening the ballast vent valve and thus releasing gasses trapped in the ballast tank with consequent drop in the effluent level from the weir.

The ballast vent valve may be manually operated or may be triggered by the increase in pressure in the ballast chamber through a pressure switch and process timer electrically connected to the vent valve. The operating level of the effluent at the bottom of the ballast chamber may be maintained by means of a level valve.

Purging of sediment collected at the bottom of the tank may be effected by a pneumatic pinch valve which may be manually operated or triggered by an induction coupling at a predetermined torque of sensing rakes or the like members movable in the tank, which may also serve the secondary function of keeping the sides of the tank constantly swept. The resistance of the sediment in the bottom of the tank is indicated e.g. by the induction coupling between the motor and the gearbox driving shaft.

The slurry extruded from the outlet may be sufficiently stable to be removed on a conveyor belt located below the tank.

The method is applicable in treating effluent containing solids chemically treated with flocculant reagent in order to agglomerate the fine particles of the slurry. In doing this water gets trapped in the particles. To release the water the slurry must be squeezed very gently. This can be achieved by different depths of filter beds.

Application of too much pressure too quickly to the slurry causes the flocks to break down so that the slurry will reabsorb water. This will make a slurry that contains a high percentage of water.

In the case of an acidic effluent, to neutralize the effluent the sand in the filter can be charged with soda ash, lime or other alkaline material for neutralizing the effluent.

The invention will be further described by way of example with reference to the accompanying drawing which is a tranverse section through a sand settler filter according to the invention.

A tank 1 has a louvre slotted plate support 2 below which an annular ballast tank wall 3 extends downwardly spaced inwardly from the outer tank wall and presenting an annular lower opening 4 within the tank 1.

an effluent feed distributor 5 is carried centrally of the tank 1 on a support frame 6 suspended from support grillage 7 from the support plate 2.

A weir 8 is provided by an inner upper edge of a scum trough 9 formed by an L section angle member secured round the periphery of the tank.

Bottom 10 of the tank 1 supported by legs 11 slopes downwardly at an angle in the range of from 30° to 55° with respect to the horizontal disposition of intended use and usually at a slope of 1 in 1 as shown. A feed pipe 12 extends trangentially to the feed well 5 from outside the tank.

Gravel and sand may be banked in a filter layer 13 on the plate 2 below weir 8 at the top of the tank 1.

A ballast pipe 14 has a pneumatic vent valve 15 and valved compresssor connection 16 is provided. The pneumatic vent valve 15 is operated in response to a ball float valve pressure sensor 17 or separate pressure sensor 27 for opening the vent when back pressure builds up in the ballast chamber 3.

A central rotating shaft with two diametrically opposed scrapers 18 is carried suspended from a gear box 19 at its upper end and located in bearings 20 supported by framework 6. The gearbox and hence the raking or sweeping arms 18 are driven by a motor 21 through an induction coupling 22 at approximately 3 revolutions per minute.

An outlet 23 at the lower part of the bottom 10 is controlled by a pneumatic valve 24 connected to a compressor 25 and actuated in response to the torque exerted by the rake driving mechanism.

In use for backwashing the filter bed, e.g. when effluent has been disturbed and undue discolouration is evident in trough 9, valve 15 is opened, being closed when the effluent level has dropped from weir 8 and a sufficient period has elapsed for it to reach purge level 26. Prefiltered scum then also falls from beneath support plate 2 for settling in the tank 1.

The ballast tanks may be emptied of effluent by opening valve 16 for repeated purging backwashing following compressed air displacing the effluent level from purge level 26 through the filter bed 13.

I claim:
1. A sand settler filter comprising a scum tank (1) having an upper part and a bottom (10);

a scum trough (9) mounted on the tank and a weir (8) carried by the upper part of the scum trough (9) to locate the weir (8) between the scum trough (9) and the upper part of the tank (1);

a perforate support (2) forming a filter bed carried across the scum tank (1) below said weir (8) and a filter medium (13) located on the support (2);

means (3) within the tank defining a ballast chamber having a lower opening (4) extending into the remaining portion of the tank (1) below the support (21)

an effluent feed (5) located below said perforate support (2) to feel effluent to the filter, back pressure sensing means (27) responsive to pressure in said ballast chamber;

and valve means (15, 23, 24) forming valved outlets from the tank controlled by said sensing means to open the outlet when a predetermined back pressure is sensed and including a valved gas outlet (15) communicating with the upper region of the ballast chamber responsive to the pressure therein sensed by the sensing means (27).

2. Filter according to claim 1, wherein the valve means comprises a sludge outlet (23, 24) located at the bottom of the tank.

3. Filter according to claim 1, wherein the valve means comprises a sludge outlet (23, 24) located at the bottom of the tank;

and the filter includes a paddle (18) located at the bottom of the tank:

a torque sensor (22) sensing torque exerted by said paddle (18), said torque sensor (22) controlling opening of the sludge outlet (23, 24) in the bottom of the tank when a predetermined torque to move the paddle (18) is exceeded.

4. Filter according to claim 1, wherein the weir (8) is formed by the inner upper edge of the scum trough (9) and the bottom of the tank slopes downwardly at an angle between about 30° to 55° with respect to a horizontal level of effluent fed to the filter.

5. Filter according to claim 4 including an effluent feed distributor carried on a feed column centrally of the tank above the outlet.

6. Filter according to claim 1 further comprising compressed air source means (25) and control valve means (16) connected to and controlling application of compressed air from said source to said ballast chamber to displace effluent therefrom and raise the effluent level in the tank from a purged level below the support through the filter bed.

7. Method of treatment of effluent in a scum tank (1) having an upper part and a bottom (10);

a scum trough (9) mounted on the tank and a weir (8) carried by the upper part of the scum trough (9) to locate the weir (8) between the scum trough (9) and the upper part of the tank (1);

a perforate support (2) forming a filter bed carried across the scum tank below said weir (8) and a filter medium (13) located on the support (2);

means (3) within the tank and defining a ballast chamber having a lower opening (4) extending into the remaining portion of the tank (1) below said support (2);

comprising the steps of distributing effluent from the effluent feed within the tank;

allowing the effluent to percolate the support and filter bed, to settle sludge below in the tank and cause treated liquor to rise to the weir for subsequent discharge from the scum trough (9);

and purging scum at the perforate support (2) and backwashing the filter bed by dropping the level of effluent in the tank.

8. A method according to claim 7 in which backwashing is effected without discharging incompletely settled sludge by venting the ballast chamber and thus releasing gasses trapped therein with consequent drop in the effluent level below the weir.

9. A method according to claim 7 in which purging and backwashing is effected by admitting compressed air to the ballast chamber and thus displacing effluent therefrom and raising the effluent level in the tank from a purge level below the support through the filter bed.

* * * * *